(12) United States Patent
Kim et al.

(10) Patent No.: US 7,665,988 B2
(45) Date of Patent: Feb. 23, 2010

(54) ASCENDING/DESCENDING APPARATUS AND COMPLEX SINTERING FURNACE USING THE SAME

(75) Inventors: Young Mo Kim, Chungcheongnam-Do (KR); Tae Shin Kim, Gyeonggi-Do (KR); Jong Hwa Lee, Gyeongsangnam-Do (KR); Jeong Woon Lee, Gyeonggi-Do (KR)

(73) Assignee: Samsung Electro-Mechanics Co., Ltd., Suwon-Si, Gyunggi-Do (KR)

( * ) Notice: Subject to any disclaimer, the term of this patent is extended or adjusted under 35 U.S.C. 154(b) by 0 days.

(21) Appl. No.: 11/761,752

(22) Filed: Jun. 12, 2007

(65) Prior Publication Data

US 2007/0284793 A1    Dec. 13, 2007

(30) Foreign Application Priority Data

Jun. 13, 2006    (KR) .................... 10-2006-0053233

(51) Int. Cl.
  *F27B 5/14*    (2006.01)
  *F27D 3/12*    (2006.01)
(52) U.S. Cl. ................. 432/241; 432/124; 432/209; 414/937; 414/940
(58) Field of Classification Search ................ 432/239, 432/241, 247, 124, 131, 142, 242, 206, 209, 432/152; 414/786, 937, 940
See application file for complete search history.

(56) References Cited

U.S. PATENT DOCUMENTS 3,166,305 A * 1/1965 Troglione et al. ............ 432/199

(Continued)

FOREIGN PATENT DOCUMENTS

CN    2671101 Y    1/2005

(Continued)

OTHER PUBLICATIONS

Korean Patent Office Notice of Allowance, issued Feb. 28, 2008.

(Continued)

*Primary Examiner*—Gregory A Wilson
(74) *Attorney, Agent, or Firm*—Lowe Hauptman Ham & Berner

(57) ABSTRACT

Provided is a complex sintering furnace to sequentially perform a bake-out process and a sintering process for molding ceramic products. The complex sintering furnace includes: a support frame; a pair of furnace bodies supported on the top of the support frame and having a built-in heat insulator covered by a disc-shaped cover; a pair of rails arranged under the support frame in parallel in a length direction along arrangement of the furnace bodies; a rotating base horizontally transferred along the rails and rotatably connected to bottoms of the furnace bodies when the rotating base is vertically transferred directly under the bottoms of the furnace bodies, the rotating base including a separately rotating setter mounted the top thereof; and an ascending/descending apparatus mounted under the rotating bases and having a ball-screw type rotation shaft to vertically ascend/descend the rotating base at the same time of the separate rotation of the setters. Accordingly, the production efficiency of the ceramic products can be significantly improved by rapidly transferring to the post-processes and simultaneously performing the bake-out process and the sintering process.

6 Claims, 6 Drawing Sheets

U.S. PATENT DOCUMENTS

| | | | | |
|---|---|---|---|---|
| 3,749,383 | A * | 7/1973 | Voigt et al. | 266/249 |
| 3,883,295 | A * | 5/1975 | Lowderman et al. | 432/138 |
| 3,940,242 | A * | 2/1976 | Matsumura et al. | 432/124 |
| 4,725,227 | A * | 2/1988 | Hailey | 432/239 |
| 4,790,750 | A * | 12/1988 | Bourel et al. | 432/239 |
| 4,955,775 | A * | 9/1990 | Ohkase et al. | 414/152 |
| 5,035,597 | A * | 7/1991 | Tanaka et al. | 425/135 |
| 5,180,273 | A * | 1/1993 | Sakaya et al. | 414/404 |
| 5,234,528 | A * | 8/1993 | Nishi | 156/345.31 |
| 5,507,639 | A * | 4/1996 | Monoe | 432/77 |
| 5,565,034 | A * | 10/1996 | Nanbu et al. | 118/668 |
| 6,168,426 | B1 * | 1/2001 | Yamada | 432/152 |
| 6,328,561 | B1 * | 12/2001 | Hasper et al. | 432/238 |
| 6,390,753 | B1 * | 5/2002 | De Ridder | 414/160 |
| 6,844,523 | B2 * | 1/2005 | Yamazaki et al. | 219/121.66 |
| 2003/0089690 | A1 * | 5/2003 | Yamazaki et al. | 219/121.66 |
| 2003/0185561 | A1 * | 10/2003 | Inagaki | 396/611 |
| 2007/0246664 | A1 * | 10/2007 | Yamazaki et al. | 250/491.1 |

FOREIGN PATENT DOCUMENTS

| | | |
|---|---|---|
| JP | 06-123559 A | 5/1994 |
| JP | 2000-88468 A | 3/2000 |
| KR | 10-1999-0086645 A | 12/1999 |
| KR | 10-2005-0067277 A | 1/2005 |
| KR | 10-2005-0067277 A | 7/2005 |

OTHER PUBLICATIONS

Chinese Patent Office, Office Action issued Oct. 31, 2008.

* cited by examiner

[FIG. 2]
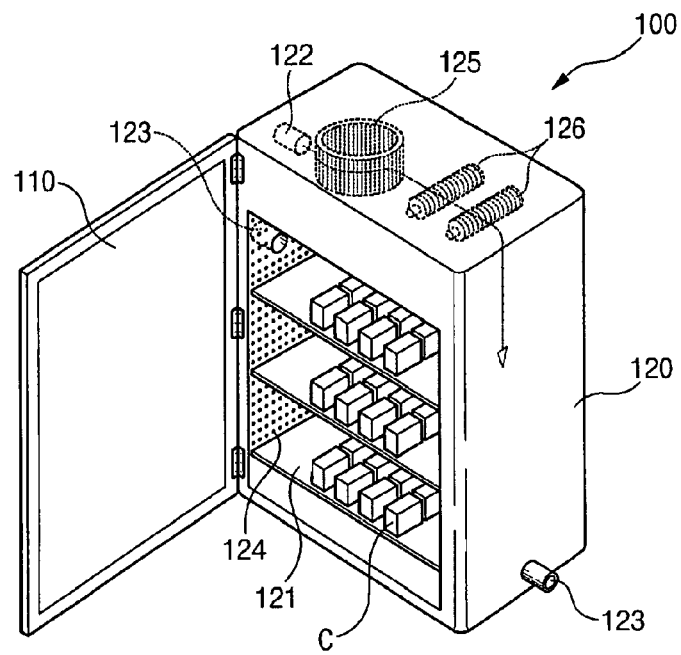
PRIOR ART
[FIG. 1]
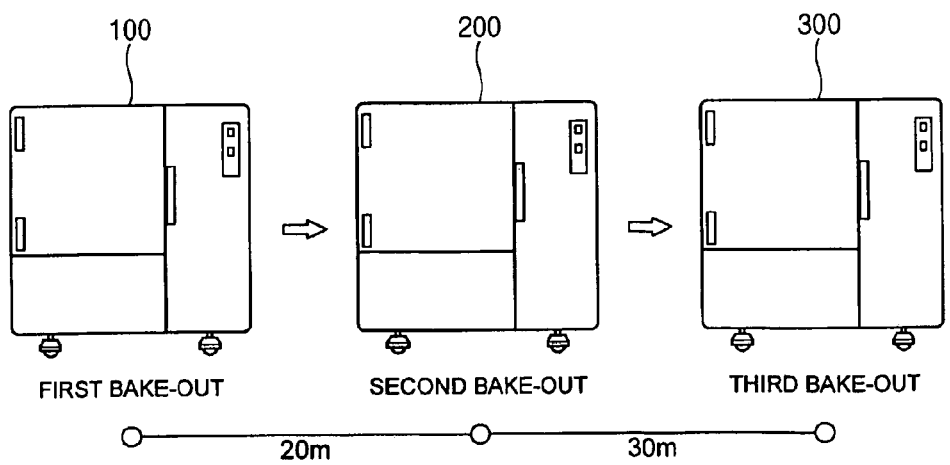
PRIOR ART

[FIG. 3]
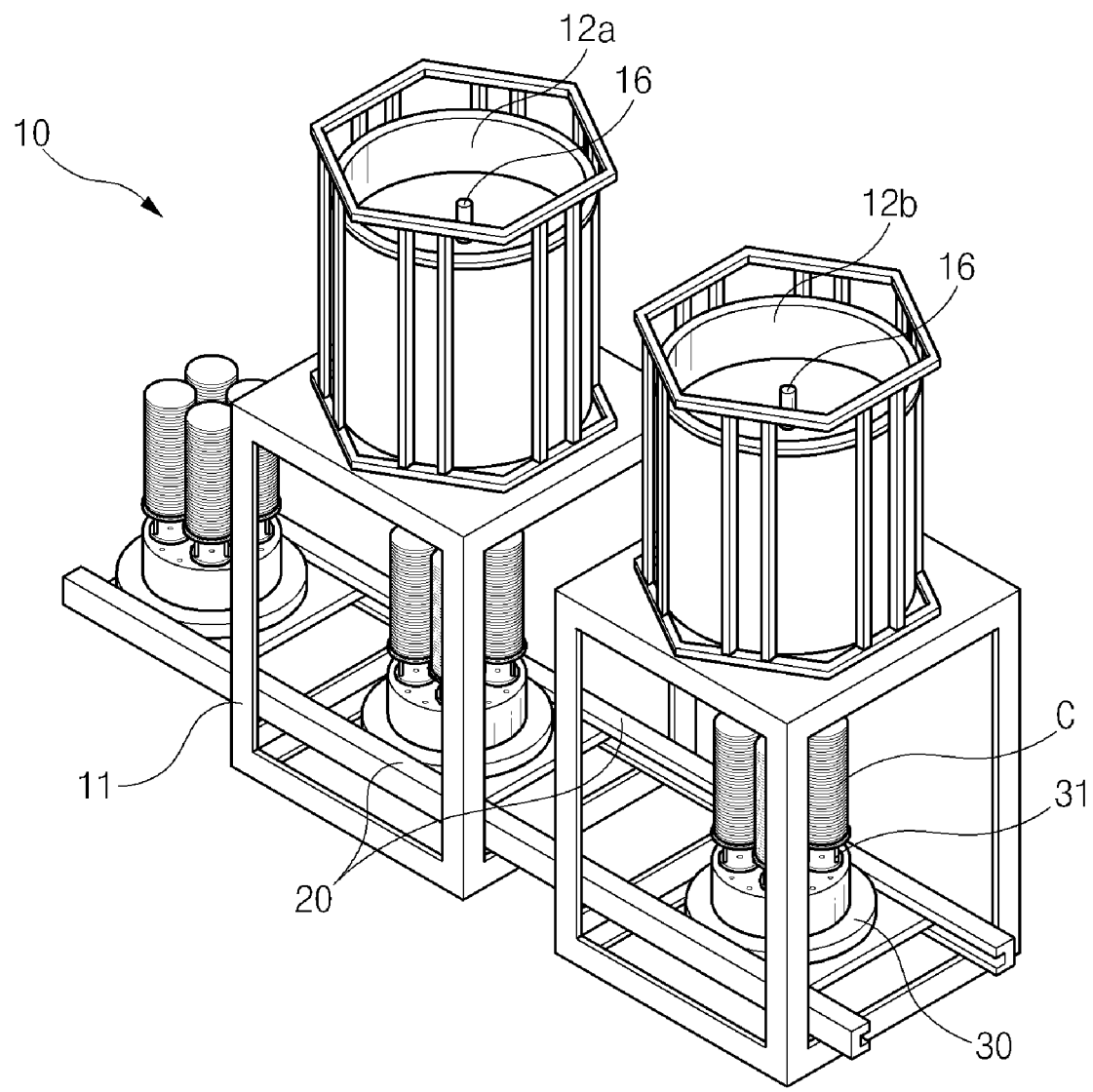

[FIG. 4]
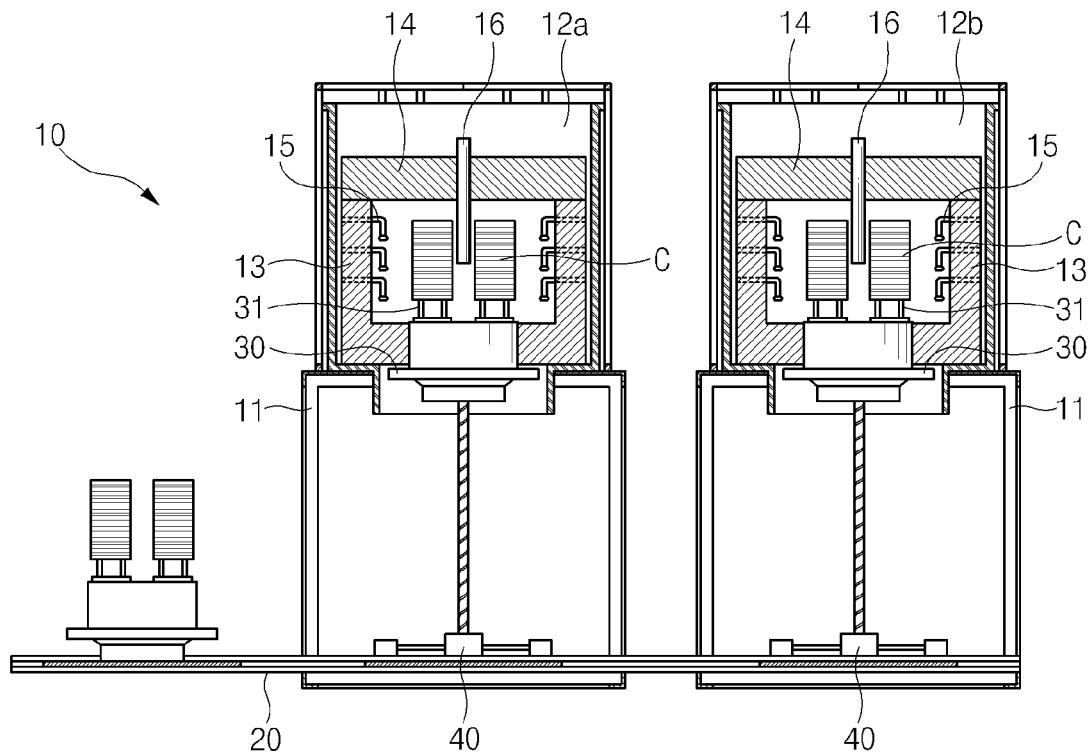
[FIG. 5]
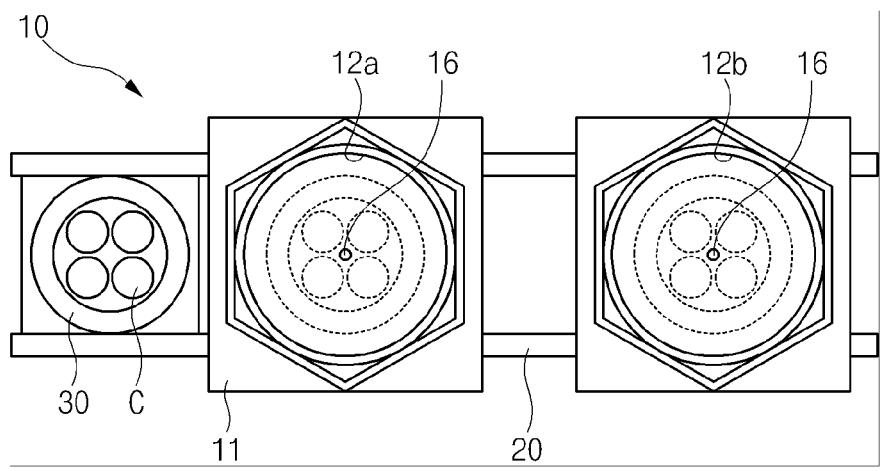

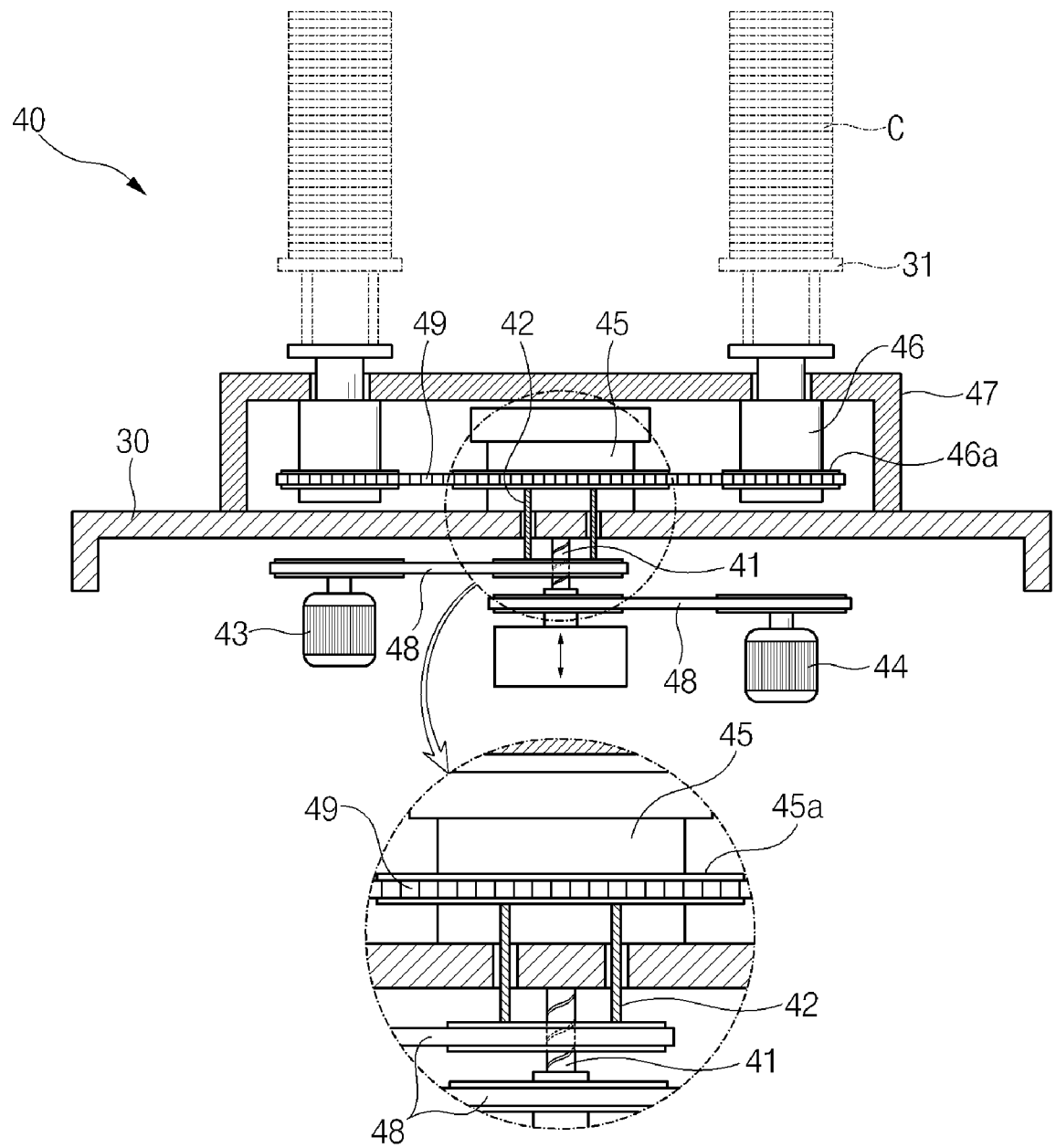
[FIG. 6]

[FIG. 7]
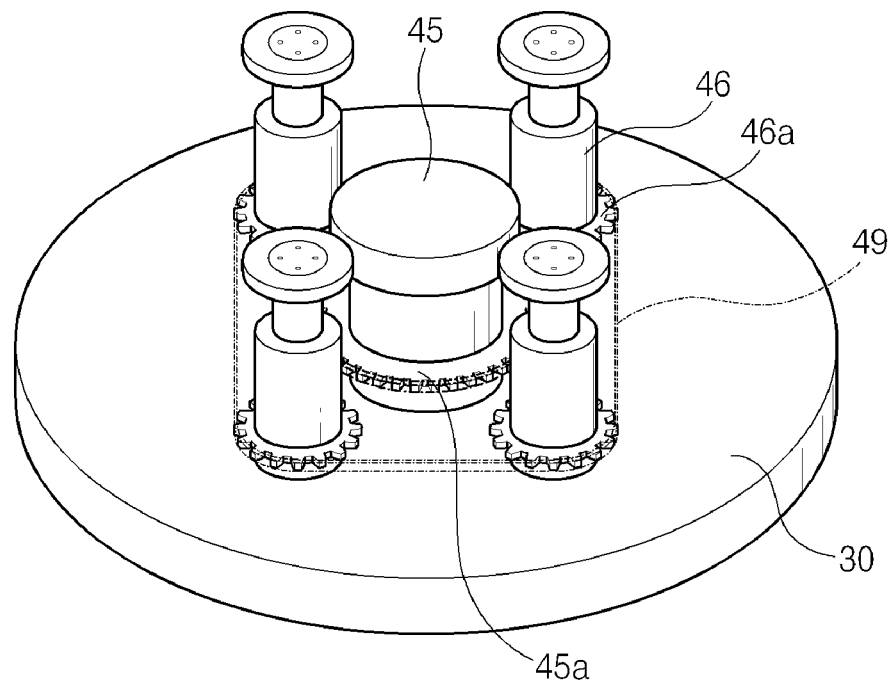
[FIG. 8]
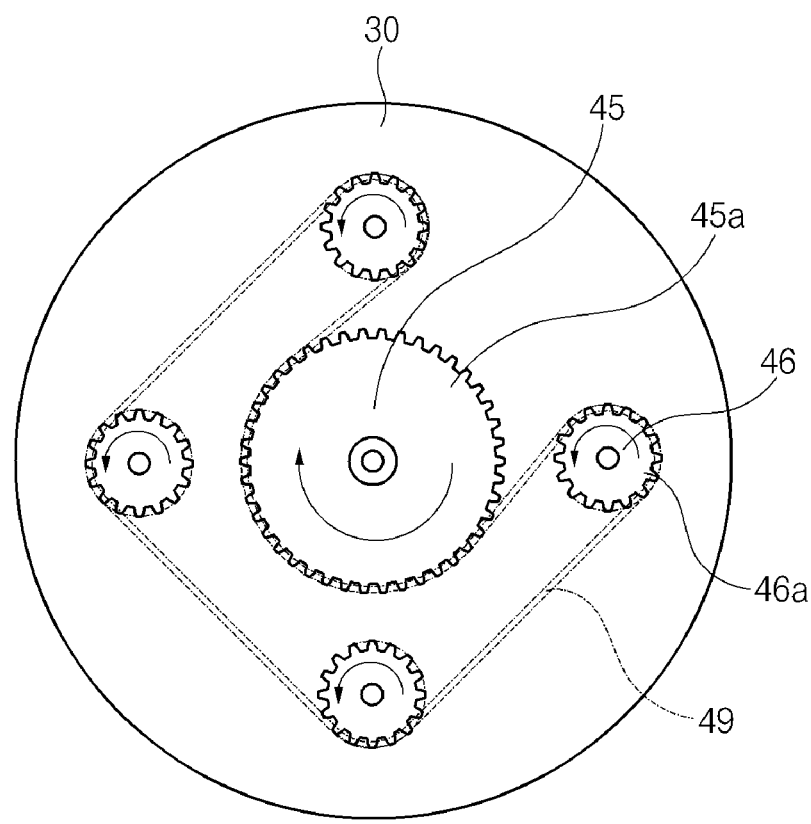

[FIG. 9]
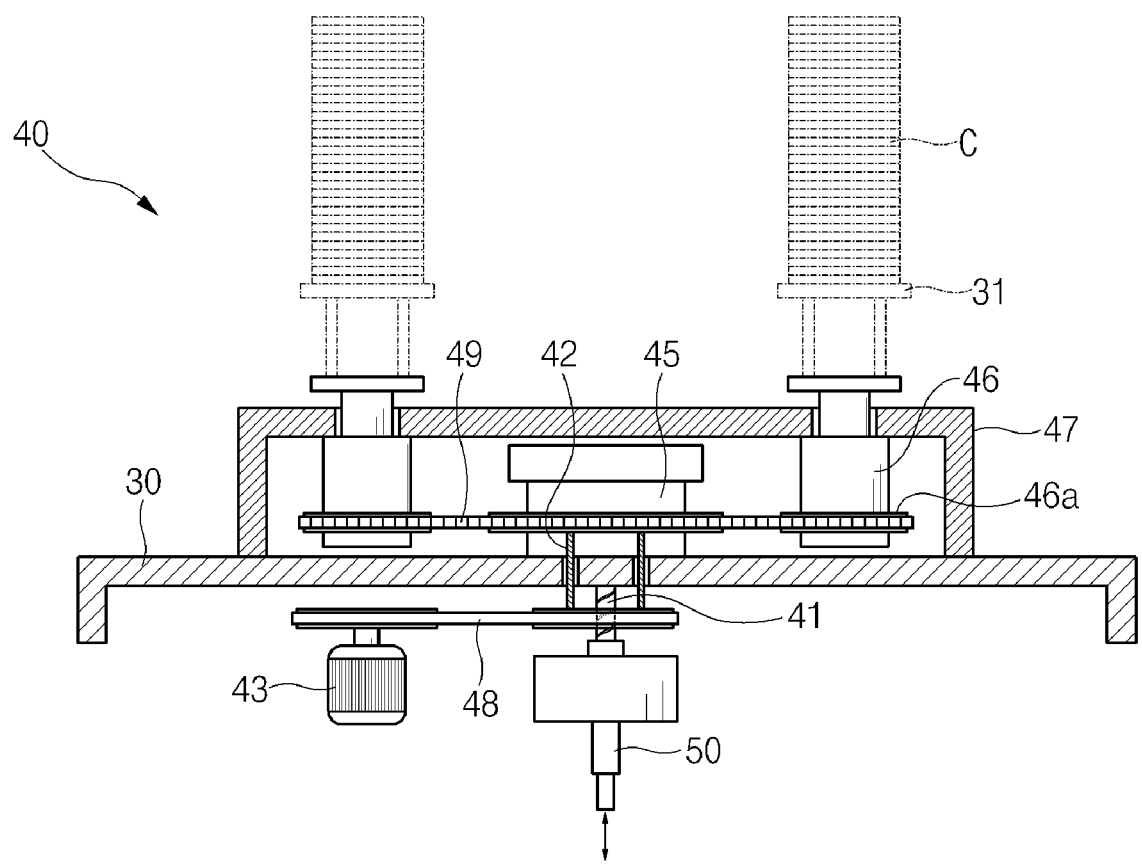

ASCENDING/DESCENDING APPARATUS AND COMPLEX SINTERING FURNACE USING THE SAME

CROSS-REFERENCE TO RELATED APPLICATIONS

This application claims the benefit of Korean Patent Application No. 10-2006-0053233 filed with the Korea Intellectual Property Office on Jun. 13, 2006, the disclosure of which is incorporated herein by reference.

BACKGROUND OF THE INVENTION

1. Field of the Invention

The present invention relates to a complex sintering furnace that sequentially performs a bake-out process and a sintering process for molding ceramic products, and more particularly, to an ascending/descending apparatus and a complex sintering furnace using the same, which can obtain smooth gas flow and uniform temperature distribution. In the complex sintering furnace, the vertical transfer and rotation of a rotating base on which a plurality of ceramic moldings are loaded are simultaneously achieved so that a bake-out process and a sintering process can be simultaneously performed through the cylindrical furnace bodies arranged adjacent to each other.

2. Description of the Related Art

Examples of ceramic electronic products include multi-layer ceramic capacitor, ferrite, and piezoelectric devices. In a process of manufacturing the ceramic electronic products, ceramic materials are molded in a predetermined shape and a multi-layer ceramic molding is manufactured through a de-binder process, a sintering process, and a cooling process.

In the process of manufacturing the ceramic molding, slurry is formed by adding a binder (organic component) to raw material powder, such as $BaTiO_3$, $CaCa_3$, MnO, and Glass Frit. A ceramic sheet using the slurry as a dielectric sheet is molded. An internal electrode is pattern-printed on the surface of the ceramic sheet. The internal electrode is formed of a metal, such as Ni, Cu, Pd, and Pd/Ag. Such a ceramic sheet is stacked in multi-layers, thereby forming a multi-layer sheet. The multi-layer sheet is pressed under a pressure of 500-1300 $kgf/cm^2$. Then, the pressed multi-layer sheet is cut into predetermined lengths, finally manufacturing the rectangular-parallelopiped ceramic molding.

A de-binder process, a sintering process, and a cooling process are sequentially performed on the ceramic molding. The de-binder process is to remove a binder component by baking out the ceramic molding at a temperature of 230-350° C. in the sintering furnace. The sintering process is to sinter the ceramic molding at a temperature of 900-1300° C. for 10-24 hours. The cooling process is to cool the ceramic molding at a low temperature after the sintering process. An external electrode and a terminal electrode are deposited on a periphery of the ceramic molding sintered in the sintering furnace. In this way, the ceramic product is completely manufactured.

A basic structure of a conventional complex sintering furnace will be described below with reference to FIGS. 1 and 2.

FIG. 1 is a perspective view of a conventional complex sintering furnace, and FIG. 2 is a perspective view of the conventional complex sintering furnace when a door is opened.

Referring to FIGS. 1 and 2, each of sintering furnaces 100, 200 and 300 includes a box-shaped furnace body 120 having a door 110 openably connected to the front surface. The furnace body 120 is divided into three sections, each of which has a receiving space 121 where a plurality of ceramic moldings C are received.

The furnace body 120 includes an inlet 122 on one side and an outlet 123 on the other side or same surface. Outside air is introduced through the inlet 122. A punched plate 124 with a plurality of holes is provided on both sidewalls of the furnace body 120.

In addition, the furnace body 120 includes a fan 125 on the top thereof. The fan 125 supplies outside air introduced through the inlet 122 into the inside of the receiving space 121. A heater 126 is mounted on one side of the fan 125 so as to heat the introduced outside air.

The conventional sintering furnaces 100, 200 and 300 uses a direct hot air circulation scheme in which the air introduced into the furnace body 120 through the inlet 122 is heated by the heater 126 and is supplied to the inside of the receiving space through the punched plate 124 disposed at each side of the furnace body 120.

That is, the hot air introduced into the furnace body 120 through the heater 126 and the punched plate 124 disposed at one side bakes out or sinters the ceramic moldings C stacked within the receiving spaces 121, and is discharged through the punched plate 124 disposed at the other side after the organic binder is removed from the ceramic molding C and the sintering process is completed.

However, in the conventional sintering furnaces 100, 200 and 300, the heating source is supplied to the ceramic moldings C through the fan 125 disposed on the top of the furnace body 120 in accordance with a hot air convection scheme. Therefore, hot air with a proper temperature is supplied to locations near the punched plate 124 that is the source of the hot air. Meanwhile, hot air with a relatively low temperature is inevitably supplied to locations far away from the punched plate 124. Consequently, a large temperature difference occurs in the furnace body 120.

In addition, a plurality of bake-out furnaces and a plurality of sintering furnaces are individually arranged at intervals of 20-30 m, as shown in FIG. 1. The bake-out process and the sintering process must be performed in the respective furnace bodies 120. Therefore, when the bake-out process for molding the ceramic product is completed in the first and second bake-out furnaces 100 and 200, an operator must manually transfer the ceramic molding C stacked inside the furnace body 120 of the furnace 100 to the next bake-out furnace 200. In addition, the operator must manually transfer the ceramic molding C to the furnace body 120 of the third sintering furnace 300 in order for sintering the ceramic molding C.

In such a conventional sintering furnace, it takes a lot of time to transfer the ceramic molding C so as to perform the bake-out process and the sintering process, and the operator must manually perform these processes. Consequently, the productivity is significantly degraded because the manufacturing time of the ceramic product is delayed as much. In addition, the cost of the product increases due to the increased personnel expenses.

Furthermore, as the molding process is performed, the ceramic products molded through the conventional sintering furnace 100 should be repetitively stacked and withdrawn through the bake-out furnaces and the sintering furnaces. Consequently, the product is not molded with uniform quality. In the structure of the furnace body for performing each process, cracks may occur due to the mismatch between ceramic component and metal component of the ceramic molding due to the difference between the bake-out temperature and the sintering temperature in the ceramic molding.

SUMMARY OF THE INVENTION

An advantage of the present invention is that it provides an ascending/descending apparatus and a complex sintering furnace using the same. In the complex sintering furnace, a rotating base on which a plurality of ceramic moldings are loaded are continuously transferred along rails disposed under a pair of the furnace bodies installed adjacent to each other and managing the bake-out process and the sintering process. Accordingly, the production efficiency of the ceramic products can be significantly improved by rapidly transferring to the post-processes and simultaneously performing the bake-out process and the sintering process.

Another advantage of the present invention is that it provides an ascending/descending apparatus and a complex sintering furnace, in which the ambient gas can smoothly flow within the furnace bodies because of the independent rotation of the rotating base and the setter mounted thereon, thereby manufacturing the ceramic products with uniform quality.

Additional aspect and advantages of the present general inventive concept will be set forth in part in the description which follows and, in part, will be obvious from the description, or may be learned by practice of the general inventive concept.

According to an aspect of the invention, a complex sintering furnace includes: a support frame; a pair of furnace bodies supported on the top of the support frame; a pair of rails arranged in parallel under the support frame along arrangement of the furnace bodies; and a rotating base horizontally transferred along the rails and tightly connected to bottoms of the furnace bodies when the rotating base is vertically transferred directly under the bottoms of the furnace bodies.

Preferably, the furnace bodies are formed in a cylindrical shape. The furnace bodies are a chamber-type vacuum furnace having a heat insulator tightly connected to an inner periphery, the heat insulator being formed of a refractory material, and a plurality of heaters passing through sidewalls of the heat insulator.

The furnace bodies are supported by the support frame to a predetermined height. The rotating base on which a plurality of ceramic moldings are stacked ascends vertically and is connected to the furnace bodies. At this point, the rotating base rotates in a forward or reverse direction, while being connected to the bottom of the furnace bodies.

At this time, a plurality of setters protrude upward from the rotating base. A plurality of ceramic moldings are vertically stacked on the setters. Therefore, the setters are rotated simultaneously and independently of the ration of the rotating base.

Further, an ambient gas is supplied through an air supply line passing through sidewalls of the furnace bodies. Due to the independent rotation of the rotating base and the setters, the ambient gas injected into a space between the ceramic moldings is circulated. The hot air circulation is reheated by the radiant heat radiating through the heaters mounted on the sidewalls of the inner walls of the heat insulator. Consequently, the ambient gas is uniformly distributed around the ceramic molding within the furnace bodies.

The rotating base is arranged in a row on the rails arranged in parallel within the support frame at an equal interval. The rotating base is continuously transferred along the rails. When the rotating base is located under the furnace bodies, the ascending/descending apparatus including the rotating base operates to ascend the rotating base so that it is connected to the bottom of the furnace body. Therefore, the ceramic moldings loaded on the rotating base are simultaneously inserted into the pair of the furnace bodies, so that the bake-out process and the sintering process can be performed at the same time.

According to another aspect of the present invention, an ascending/descending apparatus of a complex sintering furnace includes: a first rotation shaft and a second rotation shaft connected to motors and separately rotating; a rotating base having a bottom center portion supported on the top of the first rotation shaft, the rotating base surrounding the first rotating shaft and being perforated by the second rotation shaft; a plurality of setter supports arranged radially outside a support shaft tightly connected to the top of the second rotation shaft, setters being mounted on the top of the setter supports; and a torque transmitter having a periphery connected to the support shaft and the setter supporters, such that the support shaft and the setter supporters are organically rotated.

Preferably, the first rotation shaft and the second rotation shaft are connected to the center portion of the rotating base. The second rotation shaft is formed in a hollow shape. The first rotation shaft is inserted into the second rotation shaft. The first rotation shaft and the second rotation shaft are rotated by the respective motors.

Preferably, gears are formed on the periphery of the support shaft rotated by the rotation of the second rotation shaft and the periphery of the setters radially arranged outside the support shaft. A torque transmitter is connected to the gears of the support shaft and the setters. The torque transmitter surrounds the periphery of the setter supports and passes through the periphery of the support shaft.

The rotating base rotates and ascends due to the rotation of the rotation shaft. Due to the rotation of the second rotation shaft, the support shaft and the setters are rotated by the torque transmitter. Therefore, while the ceramic moldings loaded on the setters are ascending/descending, each setter can independently rotate on the rotating base.

Preferably, the rotation direction of the rotating base is opposite to that of each setter.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a perspective view of a conventional complex sintering furnace;

FIG. 2 is a perspective view of a conventional complex sintering furnace when a door is opened;

FIG. 3 is a perspective view of a complex sintering furnace according to an embodiment of the present invention;

FIG. 4 is a sectional view of the complex sintering furnace shown in FIG. 3;

FIG. 5 is a plan view of the complex sintering furnace shown in FIG. 3;

FIG. 6 is a sectional view of an ascending/descending apparatus according to an embodiment of the present invention;

FIG. 7 is a perspective view of the ascending/descending apparatus when a cover is removed;

FIG. 8 is a plan view of the ascending/descending apparatus shown in FIG. 7; and FIG. 9 is a sectional view of an ascending/descending apparatus according to another embodiment of the present invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Structure of Complex Sintering Furnace

FIG. 3 is a perspective view of a complex sintering furnace according to an embodiment of the present invention, FIG. 4 is a sectional view of the complex sintering furnace shown in FIG. 3, and FIG. 5 is a plan view of the complex sintering furnace shown in FIG. 3.

Referring to FIGS. 3 to 5, the complex sintering furnace 10 includes a support frame 11, a pair of furnace bodies 12a and 12b supported on top of the support frame 11, a pair of rails 20 disposed in parallel inside the support frame 11, and a rotating base 30 disposed at equal intervals along the rails 20 and horizontally transferred. A plurality of ceramic moldings C are stacked on the base 30.

A cylindrical heat insulator 13 is inserted into the furnace body 12 and is covered by a disc-shaped cover 14. The heat insulator 13 has a plurality of heaters 15 on sidewalls.

In addition, ambient gas containing a mixture of $N_2$ and $O_2$ is injected into the heat insulator 13 and heated by the heater 15 above a predetermined temperature. The ambient gas with the high temperature bakes out or sinters the plurality of ceramic moldings C inserted into the heat insulator 13.

After completing the bake-out process and the sintering process on the ceramic molding C, the ambient gas containing the organic material such as a binder discharged from the ceramic molding C is discharged to the outside together with impurities through the outlet 16 disposed on the center portion of the disc-shaped cover 14 for sealing the heat insulator 13.

The pair of the furnace bodies 12a and 12b manage the bake-out process and the sintering process on the ceramic molding C, respectively. The structures of the heat insulator 13 and the heater 15 can be modified properly.

Meanwhile, a plurality of setters 31 are rotatably connected on the top of the rotating base 30, so that the rotating base 30 is continuously transferred horizontally along the rails 20 disposed in parallel within the support frame 11. During the horizontal transfer of the rotating base 30, the ascending/descending apparatus 40 vertically transfers the rotating base 30. The ascending/descending apparatus 40 is disposed below the furnace body 12.

The plurality of ceramic moldings C are stacked on the top of the setters 31 protruding upwards from the rotating base 30 vertically transferred by the ascending/descending apparatus 40. The rotating base 30 rotates in one direction while being transferred vertically by the ascending/descending apparatus 40. The rotation of the rotating base 30 is achieved by a screw-like support included in the ascending/descending apparatus 40. The rotation of the rotating base 30 and the structure of the ascending/descending apparatus will be described later in more detail.

In the complex sintering furnace 10, the rotating base 30 on which a plurality of ceramic moldings C are stacked is transferred at predetermined intervals along the rails 20 disposed under the furnace bodies 12a and 12b. Then, the rotating base 30 is vertically transferred such that it is tightly contacted with the bottoms of the furnace bodies 12a and 12b by the driving of the ascending/descending apparatus 40 disposed under the furnace bodies 12a and 12b performing the bake-out process and the sintering process. In this way, it is possible to reduce the processing time for transferring the ceramic moldings of the bake-out furnaces 100 and 200 and the sintering furnace 300 to the next process.

The rotating bases 30 disposed directly under the furnace bodies 12a and 12b for performing the bake-out process and the sintering process are connected to the bottoms of the furnace bodies 12a and 12b at the same time by the driving of the ascending/descending apparatus 40. Consequently, the ceramic moldings C is loaded into the heat insulator 13 in the each furnace body 12a and 12b. The bake-out process and the sintering process are performed in the furnace bodies 12a and 12b.

The rotating bases 30 connected to the bottom of each furnace body 12a and 12b are rotated by the screw shaft of the ascending/descending apparatus 40, and the setters 31 are rotated individually. At this point, it is preferable that the rotating base 30 and the setter 31 are rotated in an opposite direction.

Structure of Ascending/Descending Apparatus

FIG. 6 is a sectional view of the ascending/descending apparatus according to an embodiment of the present invention, FIG. 7 is a perspective view of the ascending/descending apparatus shown in FIG. 6 when a cover is removed, and FIG. 8 is a plan view of the ascending/descending apparatus shown in FIG. 7.

Referring to FIGS. 6 to 8, the ascending/descending apparatus 40 includes a first rotation shaft 41 and a second rotation shaft 42 connected to motors 43 and 44, a rotating base 30 supported on the first rotation shaft 41, and a setter support 46 for supporting a plurality of setters 31 radially arranged with a support shaft 45 mounted on the top of the second rotation shaft 42.

A circular cover 47 is connected on the top of the rotating base 30 to surround the support shaft 45 and the setter support 46. The upper portion of the setter support 46 is protrudingly mounted through the cover 47. At this point, the setter 31 on which the ceramic moldings C are vertically stacked is mounted on the top of the setter support 46 protruding upward from the cover 47.

The first rotation shaft 41 and the second rotation shaft 42 are connected to the motors 43 and 44 disposed on both sides thereof. Specifically, the torque of the motors 43 and 44 is transferred to the rotation shafts 41 and 42 through a belt 48.

In addition, the first rotation shaft 41 and the second rotation shaft 42 are supported by or passed through the center portion of the disc-shaped rotating base 30. At this point, the second rotation shaft 42 is formed in a shape of a hollow pipe, so that the first rotation shaft 41 is rotated individually within the second rotation shaft 42.

That is, when the first rotation shaft 41 supports the bottom center portion of the rotating base 30, the torque is transferred to the rotating base 30 during the rotation of the first rotation shaft 41 through the motor 44, so that the rotating base 30 is rotated. At the same time, the rotating base 30 is vertically ascended/descended within the vertical transfer range of the first rotation shaft 41 due to the ball screw driving method.

The second rotation shaft 42 mounted on the center portion of the rotating base 30 and surrounding the periphery of the first rotation shaft 41 forms a hollow pipe and is rotated by the driving of the motor 43 connected through the belt 48. The upper portion of the second rotation shaft 42 is connected to the support shaft 45 mounted on the top center portion of the rotating base 30. Therefore, the support shaft 45 is integrally rotated with the second rotation shaft 42 by the torque of the motor 43.

Meanwhile, the support shaft 45 is installed on the center portion of the rotating base 30, and the plurality of setter supports 46 are installed radially in the periphery of the rotating base 30. Gears 45a and 46a are disposed on the peripheries of the support shaft 45 and the setter supports 46. A torque transmitter 49 connecting the support shaft 45 and the plurality of setter supports 46 is connected through the gears 45a and 46a.

A chain may be used as the torque transmitter 49. The torque transmitter 49 is mounted through the gears 45a and 46a of the peripheries of the support shaft 45 and the setter supports 46, as shown in FIGS. 7 and 8.

The torque transmitter 49 is connected in a "U" shape, such that it passes through the gear 45a of the rotation shaft 45 and mutually connects the gears 46a disposed in the periphery of the setter supports 46. Consequently, unidirectional circulation transfer is achieved. Therefore, the setter supports 46 disposed radially with respect to the support shaft 45 are continuously rotated in an opposite direction. The ceramic molding C loaded on the top of the setter 31 is rotated independently of the rotating base 30 due to the rotation of the setter support 46.

FIG. 9 is a sectional view of an ascending/descending apparatus according to another embodiment of the present invention. Referring to FIG. 9, the vertical transfer unit of the first rotation shaft 41 for vertically driving the rotating base 30 is implemented with a cylinder 50 using hydraulic or pneumatic pressure. In this case, although the first rotation shaft 41 must have a separate rotation driver, the load applied on the rotation shaft in the screw method can be reduced.

Like reference numerals are used to refer to the same elements except the cylinder 50 throughout the drawings, and the duplicate descriptions thereof will be omitted.

The ascending/descending apparatus 40 ascends/descends the rotating base 30 at the same time when the first rotation shaft 41 and the second rotation shaft 42 are rotated by one or more motors 43 and 44. The plurality of setter supports 46 mounted on the top of the rotating base 30 is rotated by the torque transmitter 49 passing through the periphery of the rotation shaft 45. While the rotating base 30 having a plurality of ceramic moldings C loaded thereon is vertically transferred, the rotating base 30 is tightly connected to the bottoms of the furnace bodies 12a and 12b and rotated in one direction. In addition, the setters 31 mounted radially on the top of the rotating base 30 are rotated. Therefore, the uniform distribution state of the ambient gas in the furnace bodies 12a and 12b can be guided only through the rotation of the ceramic molding C.

As described above, the rotating base on which the plurality of ceramic moldings are loaded are continuously transferred along the rails disposed under the pair of the furnace bodies installed adjacent to each other and managing the bake-out process and the sintering process. Therefore, the production efficiency of the ceramic products can be significantly improved by rapidly transferring to the post-processes and simultaneously performing the bake-out process and the sintering process. The ambient gas smoothly flows within the furnace bodies because of the independent rotation of the rotating base and the setter mounted thereon. Consequently, it is possible to manufacture the ceramic products with uniform quality.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A complex sintering furnace comprising:
   a support frame;
   a pair of furnace bodies supported on the top of the support frame;
   a pair of rails arranged in parallel under the support frame along arrangement of the furnace bodies; and
   a rotating base horizontally transferred along the rails, the rotating base configured to be tightly connected to bottoms of the furnace bodies when the rotating base is vertically transferred under the bottoms of the furnace bodies, the rotating base having a setter mounted to the top thereof, and wherein the rotating base rotating in a forward or reverse direction is rotated independently of the setter protruding upwards and on which a plurality of ceramic moldings are vertically stacked.

2. The complex sintering furnace according to claim 1, wherein the furnace bodies are formed in a cylindrical shape and simultaneously perform a bake-out process and a sintering process, respectively.

3. The complex sintering furnace according to claim 1, wherein the furnace bodies are chamber-type vacuum furnaces having a heat insulator tightly connected to an inner periphery, the heat insulator being formed of a refractory material, and a plurality of heaters passing through sidewalls of the heat insulator.

4. The complex sintering furnace according to claim 3, wherein the heat insulator is covered by a disc-shaped cover for internal sealing, the disc-shaped cover having an outlet in the center portion of the disc-shaped cover so as to discharge an organic-mixed ambient gas within the furnace bodies.

5. The complex sintering furnace according to claim 1, wherein the setter is rotated in a direction opposite to the rotation of the rotating base.

6. The complex sintering furnace according to claim 1, wherein left/right/front/rear sides of the support frame are open.

* * * * *